Figure 1:
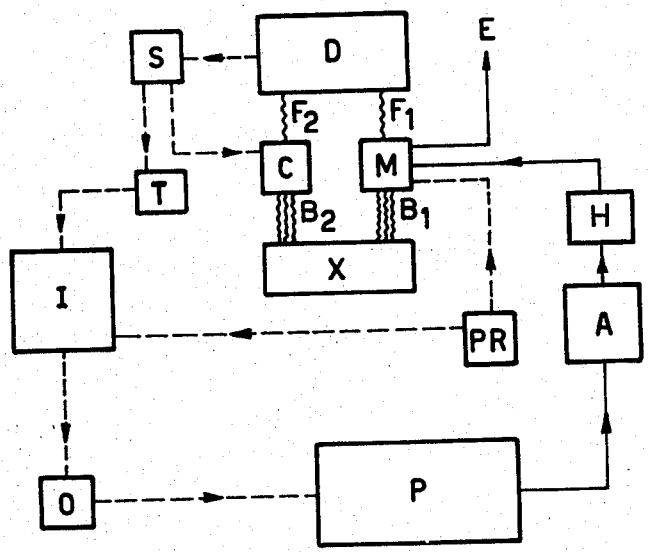

Nov. 24, 1959                H. DIJKSTRA ET AL                2,914,676
           SPECIFIC RADIATION ABSORPTION CAPACITY
              MEASUREMENT OF A SOLID SUBSTANCE
Filed Aug. 30, 1954                                    2 Sheets-Sheet 1

Inventors
Hendrik Dijkstra and
Bauke S. Sieswerda
By Cushman, Darby & Cushman
Attorneys

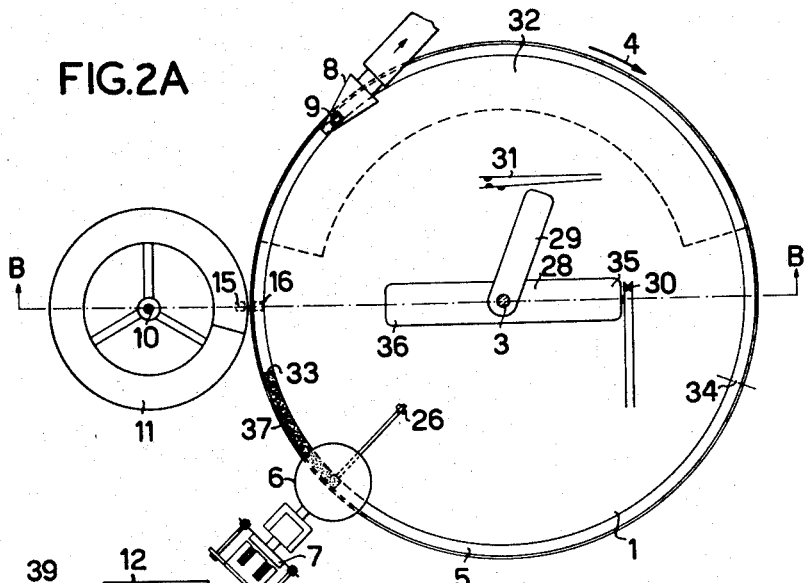
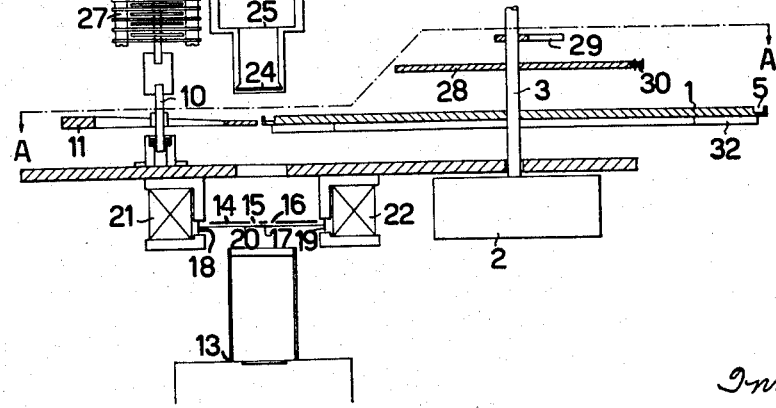

United States Patent Office 2,914,676
Patented Nov. 24, 1959

2,914,676

SPECIFIC RADIATION ABSORPTION CAPACITY MEASUREMENT OF A SOLID SUBSTANCE

Hendrik Dijkstra and Bauke S. Sieswerda, Geleen, Netherlands, assignors to Stamicarbon N.V., Heerlen, Netherlands Application August 30, 1954, Serial No. 452,896

Claims priority, application Netherlands August 28, 1953

8 Claims. (Cl. 250—83.3)

The present invention relates to a method of automatically measuring the specific radiation absorption capacity, in particular the Roentgen radiation absorption capacity, per unit of mass of a solid substance, of the type in which a beam of penetrative radiation from a source is directed into a weighed sample of finely divided substance and the radiation transmitted through said sample is photoelectrically compared with a second beam of the same radiation, while use is made of a compensator, i.e. means by which the intensity of the second radiation beam is automatically decreased and/or the intensity of the radiation beam incident upon the sample is automatically increased, proportionally to the amount of radiation absorbed by the sample, whereas the compensating action of said compensator is converted into a measuring impulse corresponding to the specific radiation absorption capacity per unit of mass of the substance tested.

Furthermore the present invention relates to an apparatus for carrying out said method.

The invention also relates to the application of the said method in a technical process, in which process an automatic quality control is applied in dependence on variation in the content of one or more components of a solid product employed in or resulting from the process, said variation being determined by measuring the specific radiation absorption capactiy per unit of mass of each of a series of successive samples of said solid product, and relates in particular to a process of dressing or otherwise treating coal, to be controlled in dependence on variation in the ash content as determined by measurement of the specific Roentgen ray absorption capacity per unit of mass of each of a series of successive samples of the coal.

In a known method of automatically measuring the specific radiation absorption capacity per unit of mass of solid substances of the type described above, the weighed sample of finely divided substance is introduced into a cell and subsequently irradiated. In order that the sample be sufficiently representative for the substance mass to be tested in a given moment, and that a sufficiently accurate measurement of the sample weight be ensured, the size of the sample should not be too small, which, in conjunction with the fact that in practice the cross section of the ray-beam applied is relatively small, involves that the layer thickness of the sample to be irradiated, by which is here understood the number of grammes of solid substance per cm.$^2$ of the cross-sectional area of the irradiating radiation beam, must be taken comparatively great. Consequently, one is not free in the choice of that layer thickness at which a maximum accuracy of the measurement is obtained.

Moreover, the layer thickness of the sample in the cell must be uniform throughout, which necessitates special measures in filling the cell.

If said method is used as the basis for an automatic quality control in a technical process and successive samples have to be irradiated periodically, the apparatus to be applied in connection with the said known method must comprise complicated mechanical devices for repeatedly and automatically filling and emptying the sample cell.

It is the main object of the invention to provide a method of the kind specified wherein a sufficiently large sample may be treated with maximum accuracy of the measurement.

A further object of the invention is to provide such method wherein lesser demands are made as regards the uniformity of the layer thickness of the sample when ready for irradiation.

Another object of the invention is to provide apparatus for carrying out the method of the kind specified which is of a simple construction as regards the means for preparing for irradiation and removing after irradiation each of a series of successive samples.

A still further object of the invention is to provide such apparatus permitting the treatment of a rapid succession of samples to be irradiated.

Still further objects and the entire scope of applicability of the invention will become apparent from the detailed description given hereinafter, in the annexed drawings and in the appertaining claims. It should be understood, however, that the detailed description is given by way of illustration and not of limitation.

In the method according to the invention, a weighed sample of finely divided solid substance is spread out in a long, relatively thin layer, which layer is passed lengthwise through the ray-beam applied for the irradiation at uniform velocity, while the successive actions of the compensator, which depend every time on the amount of radiation momently and locally absorbed by the sample, if desired after being transformed and/or amplified, are integrated over the time and thus converted into a single measuring impulse, which impulse is utilized for operating a signalling, indicating, recording or controlling device.

Preferably, the sample layer to be passed through the irradiating ray-beam is at no place wider than the said ray-beam so that the whole of the material of the sample is successively irradiated.

It is also admissible, however, to take the sample layer everywhere wider than the ray-beam to be applied. In this case, however, the cross sectional dimensions and shape of said layer should be uniform over its whole length, the part of the sample material actually irradiated then being a proportional part of the whole sample.

In case the sample layer is taken at no place wider than the ray-beam the overall uniformity of the layer cross section is not required, and the preparation of the said sample layer may be simpler.

The integration of the actions of the compensator may be carried out with means known in themselves, preferably electronic means.

When applying the method according to the invention the above-mentioned drawbacks are obviated, since:

(a) a sufficiently large sample may be irradiated, without there being a restriction in the choice of the layer thickness;

(b) lesser demands are made as regards the uniformity of the layer thickness, the effect of deviations thereof being automatically integrated, so that the means for preparing the sample for irradiation may be simpler;

(c) the apparatus to be used may be simpler in construction as regards the means for periodically preparing and removing samples, e.g., in the preferred method of realizing the invention use is made of a movable member provided with a long-stretched open-topped groove, the said groove having a bottom which is substantially permeable to the radiation to be employed, to receive the spread sample. In this case the means for preparing and removing the samples may consist, e.g., of a simple filling hopper and a suction apparatus.

The method according to the invention permits of the application of a continuous stream of the finely divided solid substance to be examined, in which case the integrating mechanism is operated periodically so as to select separate samples. It will be understood that the mean layer thickness as hereinbefore defined of the stream of solid substance to be irradiated must then be constant over its whole length. In this case the method according to the invention permits of a very rapid succession of measurements of the specific radiation absorption capacity per unit of mass.

The said continuous stream of material may itself be a sample extract from a larger mass of the solid substance to be examined.

As in the mode of operation according to the invention a comparatively thin layer of substance is irradiated, care should be taken that the sample be so finely divided that also in this case a sufficiently tight packing of the particles is obtained. This may involve that in the method according to the invention a smaller mean particle size has to be applied than is usual in known methods.

By the application of the method according to the invention an important additional advantage is obtained. For, as the measurement is carried out in a period of time which is in any case long in respect to the period of the noise in the photoelectric detector(s) applied, the mean response of said detector(s) is automatically obtained, so that no separate means need be applied to compensate for the influence of the noise therein.

Preferably the layer thickness of the sample to be irradiated is so chosen, that the absorption measurement has its maximum accuracy, that is that thickness at which the proportion between the intensity of the radiation transmitted through the sample and the intensity of the radiation incident upon the sample is $e^{-2}$. Although, as said above, it is not generally necessary for the sample to be so spread out that the layer thickness is exactly uniform, it is advisable, for the reason given above, to make the layer thickness substantially uniform. At the same time the advantage is obtained that the compensating organ need not cope with too strong impulses in consequence of abrupt variation in layer thickness.

The radiation applied in the method according to the invention may be any electromagnetic or corpuscular radiation. The photoelectric detection system and the compensator may differ from case to case.

The method according to the invention is particularly suitable for being used in coal dressing processes, in which control is applied in dependence on variation in the ash content of the coal, said variations being determined by measuring the specific Roentgen-ray absorption capacity per unit of mass of the coal.

The object of the preferably automatic and continuous control of such processes, e.g., the washing treatment of raw run-of-mine coal, is to obtain a coal of a certain predetermined quality, i.e., a coal with an ash content which is constant within predetermined limits.

Such a control is necessary because the ash content of the raw run-of-mine coal generally fluctuates considerably, which, if the adjustment of, e.g., the separatory device employed is left unaltered, might result in variations in the ash content of the dressed coal.

Fluctuations in the ash content of the raw run-of-mine coal recurring at relatively short intervals are automatically levelled by a certain degree of mixing occurring in the treatment before and during the dressing process; fluctuations occurring over longer periods, however, require special measures.

In practice it is customary to regularly draw samples from the dressed coal to determine the ash content of these samples. In dependence on the results of these ash-content determinations the adjustment of the preparatory device, e.g., the specific gravity of the separating medium in a fluid washer, is controlled.

If such control is applied it is an important condition that the sample be representative of the dressed coal obtained during a given period and that there be a short interval only between the moment of sampling and the moment when the determined value of the ash content can be converted into a—whether or not automatic—impulse for altering the adjustment of the preparatory device.

In order to ensure a useful control it is therefore necessary to combine the frequent drawing of small, representative samples with the speediest possible determination of the ash content, while, moreover, the latter should preferably be of such a nature that impulses can be obtained which can be directly utilized for governing automatic control means of the preparatory device.

By applying the method according to the invention in combination with automatic sampling, automatic sample grinding and automatic sample weighing, a control may be obtained which is effective in the above-mentioned respects. In this case the finally resulting measuring impulse from the integration mechanism is used for the direct control of the preparatory device.

In co-pending patent application No. 414,375 it is stated that the use of a technical Roentgen-radiation composed substantially entirely of rays having a wave length greater than 1.74 A., is of special advantage in the determination of the ash content of coal by means of the measurement of the Roentgen ray absorption capacity of the coal. When such a soft radiation is applied it is necessary that the layer thickness of the sample to be irradiated be not too great. It appears that the method according to the invention again presents an advantage in this particular case.

Without the invention being restricted thereto it will be explained with the help of the annexed drawings.

Figure 1 is a block diagram representing a technical process, in which the method according to the invention is applied.

Figures 2A and 2B represent two sections through the essential parts of an apparatus according to the invention, especially suited for automatically measuring the specific Roetgen-ray absorption capacity per unit of mass of a solid substance, e.g., coal. Figure 2B is a section along BB in Figure 2A; Figure 2A is a section along AA in Figure 2B.

In Figure 1, P stands for the technical process in which an automatic quality control is to be applied in dependence on variation in the specific radiation absorption capacity of a solid product employed in or resulting from the process. Periodically an automatic sampler A takes sampleso f such a product, which samples are treated in a device H, in such a manner, e.g., by successive drying, grinding and weighing, that weighed samples of the grain size desired for the absorption measurement are obtained. In the measuring apparatus M, controlled by a time schedule controller PR, each sample is spread out and passed as a long and relatively thin layer through a ray beam $B_1$ from a radiation source X. After being measured each sample is discharged from the system along the way denoted by E; in the event that the material under test is costly, the sample substance may be returned to the process P. The radiation $F_1$ which is transmitted through the sample is continuously compared, by means of a photoelectric detection device D, with the radiation $F_2$ passing through a compensator C placed in the path of a second ray-beam $B_2$ also emanating from the source X. The impulses from the detection device D, which result from differences in proportionality between the radiations absorbed in M and C, are fed to a servo-mechanism S, which operates the compensator C in such a way that the amount of radiation absorbed by C is constantly made proportional, e.g. equal, to the amount of radiation which is at the same moment absorbed by the sample in M.

After having been suitably transformed in a transformation organ T, the output signals of the servo-mechanism S are simultaneously fed to an integrator I which integrates over the time the signals received and converts these, inasmuch as they originate from one and the same sample, into a single measuring impulse which thus is a measure of the total absorption by the sample and, as the sample is of a given weight, also of the sepcific absorption capacity per unit of mass of the sample material.

The integrator I is controlled by the time schedule controller PR, in such a way that, in due time before the irradiation of a new sample commences, the integrator is adjusted at zero.

The resulting measuring impulse is fed to a controlling organ O, which brings about the desired quality control in the process P.

In the apparatus according to Figures 2A and 2B, 1 is a circular disk which, by means of a driving mechanism 2, can be rotated around a vertical shaft 3 in the direction indicated by the arrow 4. Near the circumference of the disk 1 there is a concentric groove 5, whose bottom is substantially permeable to the Roentgen-radiation to be used. Over the groove 5, on the one side a feed hopper 6, provided with an electromagnetic vibrator system 7 and a guiding roller 26, and on the other side a suction pipe 8 with a cleaning brush 9 are fixed.

Immediately beside the disk 1 there is a curved compensator wedge 11 which can rotate about a vertical shaft 10, the wedge being made of a material which at the given thickness absorbs a substantial amount of the Roentgen-radiation to be used. The rotation of the wedge 11 is controllable by a servomotor 12.

In the beam of radiation emitted by a Roentgen-ray tube 13 there is mounted a screen 14, in which two congruent rectangular windows 15 and 16, slightly narrower than the groove 5, are provided. Said windows are so positioned that a ray-beam passing through window 15 falls upon the wedge 11, and a ray-beam passing through window 16 passes exactly through groove 5. In front of these windows there is a rectangular plate member 17, made of a material which substantially absorbs the radiation to be applied and suspended on two slack conductor strips 18 and 19 by means of two strips 20. The strips 18 and 19 are positioned between the pole shoes of two permanent magnets 21 and 22 and are conductively connected on one side, while on the other side they are connected to an alternating current source; the magnets 21 and 22 have been so positioned with respect to each other that the lines of force between the one set of pole shoes run contrary to those between the other set.

In the path of the ray-beams and over the disk 1 and the wedge 11 there is located a photoelectric detection device 23, provided with a fluorescent screen 24 and a photo cathode 25. On the shaft 10 the set of plates of a rotating-plate condenser 27 is coupled. Furthermore, the shaft 3 bears time-schedule control arms 28 and 29 adapted to co-operate with appertaining electrical contacts 30 and 31. Finally a gauge plate 32 is fixed to disk 1 under part of the groove 5, said plate being made of a material which substantially absorbs the Roentgen-radiation to be applied.

The operation of the apparatus is as follows: The disk 1 is rotated at uniform velocity in the direction indicated by the arrow 4, so that it makes one revolution in about one minute. When the contact 31 is closed by the control arm 29, the feed hopper 6, into which, by the action of an automatic sampling device (not shown) a sample of fixed weight of the finely divided solid substance is introduced in due time once per revolution of the disk 1, is caused to open, so that, starting from 33, the sample is spread out substantially uniformly in the groove 5. The size of the samples is so chosen that in any case a spread sample does not reach beyond the position designated 34.

From the radiation emitted by the Roentgen-ray tube 13 two equal ray-beams are cut off by the windows 15 and 16. If the strips 18 and 19 are connected to an alternating tension the plate 17 will come to oscillate harmonically, mainly in a plane perpendicular to the direction of propagation of the ray-beams.

Thus the two ray-beams are capable of passing periodically and alternatively through the windows. If there is a difference between the intensity of the ray-beam transmitted through the wedge 11, and the intensity of the ray-beam transmitted through the bottom of the groove 5 and the solid material, if any, present therein, the detection organ 23 will give off an alternating voltage which controls the servo-motor 12 in such a way that the wedge 11 will be turned to take up a position at which the intensities of the transmitted ray-beams become equal. As long as parts of the groove 5 in which no sample material is present as yet are passing through the beam coming from window 16, the wedge 11 will be so positioned that the ray-beam transmitted through the wedge, and the ray-beam transmitted through the bottom of groove 5 are equal in intensity.

If now, when the disk 1 is rotated further, a sample 37 passes through the ray-beam coming from window 16, the wedge 11 will, at any moment, be so adjusted that the intensities of the two transmitted beams are equal; in other words: the wedge 11 will perform successive compensating actions, so that at any moment the extra amount of radiation absorbed by the wedge is equal to the amount of radiation absorbed by the sample, there being equality of the incident ray-beams.

The conversion of the successive compensating actions of the wedge 11 into a quantity suited for integration over the time is performed by means of the rotating plate condenser 27, which is fed by an alternating voltage. Each particular position of the wedge 11 corresponds with a certain capacity of said condenser, which capacity is integrated over the time by an electronic integrator 38. In conjunction with the fact that the bottom of the groove 5 also has a certain Roentgen-ray absorption capacity—though this is not very great—a zero-setting must be applied. By preference the condenser 27 is to this end inserted in a bridge-circuit comprising at least one variable condenser.

In due time before the irradiation of a new sample is started the integrator must be set at zero. This is achieved by a closing of the contact 30 by the end 35 of the control arm 28.

After being irradiated every sample is removed from the groove 5 in passing the suction device 8.

The brush 9 serves to prevent small amounts of solid material from being left in the groove 5.

In order to increase the accuracy of the measuring results obtained with the apparatus there is made every time after a sample has been irradiated a control measurement of the absorption by the gauge plate 32, which is fixed to the disk 1 as an absorption standard. The timely zero-setting of the integrator, which is necessary for this control measurement, is achieved by a closing of the contact 30 by the end 36 of the control arm 28. The total absorption by that part of the plate 32 which is irradiated by the ray-beam coming from window 16 is taken equal to the mean, or the desired, total absorption by the samples to be examined.

Using apparatus as shown in the drawing the ash content of coal samples has been determined to an absolute degree of accuracy of 0.1%. To this end an indicator device 39 calibrated to indicate the ash content was coupled to the integrating mechanism 38.

Use was made of a Roentgen-ray tube with cobalt anode and beryllium window, operated with a 14 kv.

tension and equipped with an Fe filter. The disk 1, including the bottom of the groove 5, the wedge 11, as well as the gauge plate 32, were made of a suitable synthetic resin, e.g., poly(methyl methacrylate).

The diameter of the disk 1 was 24 cm., the groove 5 had a width of 5 mm. and a depth of 3 mm.

Each time a dry sample of 1.500 g. of coal was irradiated, the coal being ground to a mean particle size of 0.3 mm.

It will be understood, that the apparatus shown in the drawings may be varied in many respects without departing from the scope of the present invention, as will be clear to persons skilled in the pertinent art.

Thus, a compensator wedge may be placed in the path of the ray-beam incident upon the sample and then act in a reversed manner, i.e., for increasing the intensity of the incident ray-beam proportionally to the amount of radiation momently absorbed by the sample, or, alternatively, there may be placed wedges in the paths of both the ray-beam incident upon the sample and the second ray-beam so as to achieve the desired result in combinative action under simultaneous integration of the compensating action of both wedges.

The detecting means applied may consist, e.g. of a couple of Geiger-Müller counters.

The means for passing the sample layer through the ray-beam applied for the sample irradiation may consist, e.g., of a moving endless band of flexible material provided with a suitable sample groove.

We claim:

1. In a method of automatically measuring the specific radiation absorption capacity per unit of mass of a solid substance involving the steps of directing a beam of penetrative radiation from a source into a weighed sample of finely divided substance, detecting radiation transmitted through said sample, comparing photoelectrically said transmitted radiation with a second beam of the same radiation, applying a compensator for automatically decreasing the intensity of said second radiation beam proportionally to the amount of radiation absorbed by said sample and converting the action of said compensator into a measuring impulse, the improvement which comprises spreading the sample into a long relatively thin layer, passing said sample layer lengthwise and at uniform velocity through the radiation beam applied for the sample irradiation and integrating the successive actions of the compensator over the time necessary to effect passage of the sample layer through the radiation beam.

2. Method according to claim 1, wherein the sample layer is everywhere wider than the beam of radiation applied for its irradiation, whereas the cross sectional shape and dimensions of said layer are made uniform over the whole length thereof.

3. In apparatus for automatically measuring the specific radiation absorption capacity per unit of mass of a solid substance of the type that includes means for directing a beam of penetrative radiation from a source into a weighed sample of finely divided substance, means for detecting radiation transmitted through said sample, means for photoelectrically comparing said transmitted radiation with a second beam of the same radiation, a compensator adapted to automatically decrease the intensity of said second radiation beam proportionally to the amount of radiation absorbed by said sample and means for converting the action of said compensator into a measuring impulse; a movable member provided with a long-stretched open-topped groove the bottom of which groove is substantially permeable to the radiation to be applied, means for spreading the sample into said groove, means for moving said member so that said groove passes lengthwise through the radiation beam intended for the irradiation of the sample at uniform velocity and means for integrating the successive actions of the compensator over the time.

4. Apparatus according to claim 3, wherein the groove is of U-shape cross-section.

5. Apparatus according to claim 3, wherein the movable member bearing the groove for receiving the sample is so constructed that the groove can follow an endless course, whereas it comprises means for automatically removing the sample from the groove after it has passed through the irradiating radiation beam.

6. Apparatus according to claim 3, wherein the movable member bearing the groove for receiving the sample is in the form of a disk which is rotatable about a vertical axis, which disk is provided with a concentric groove near its periphery.

7. A method for automatically controlling the quality of a solid substance, said method comprising the steps of periodically taking weighed samples of the substance, measuring the specific radiation absorption capacity per unit of mass of each successive sample by directing a beam of penetrative radiation from the source into the weighed sample of finely divided substance spread into a long relatively thin layer, passing said sample lengthwise and at uniform velocity through the radiation beam applied for the sample irradiation, detecting radiation transmitted through said sample, comparing photoelectrically said transmitted radiation with a second beam of the same radiation, applying a compensator for automatically decreasing the intensity of said second radiation beam proportionally to the amount of radiation absorbed by said sample, integrating the successive actions of the compensator over the time necessary to effect passage of the sample layer through the radiation beam and converting the same into a measuring impulse, and utilizing the periodic impulses thus obtained for effecting the changes required for quality control.

8. In a process for dressing coal wherein quality control is applied in dependence on variation in the ash content of the coal, said process comprising the steps of periodically taking weighed samples of the coal, measuring each successive sample by directing a beam of Roentgen-radiation into the weighed sample of the coal spread in finely divided form into a long relatively thin layer, passing said sample lengthwise and at uniform velocity through the radiation beam applied for the sample irradiation, detecting radiation transmitted through said sample, comparing photoelectrically said transmitted radiation with a second beam of the same radiation, applying a compensator for automatically decreasing the intensity of said second radiation beam proportionally to the amount of radiation absorbed by said sample, integrating the successive actions of the compensator over the time required to pass the sample layer through the radiation beam and converting the same into a measuring impulse, and utilizing the periodic impulses thus obtained for effecting the changes required for quality control.

References Cited in the file of this patent

UNITED STATES PATENTS

| | | |
|---|---|---|
| 2,467,812 | Clapp | Apr. 19, 1949 |
| 2,525,292 | Fua et al. | Oct. 10, 1950 |
| 2,704,079 | Molins et al. | Mar. 15, 1955 |
| 2,737,186 | Molins et al. | Mar. 6, 1956 |